US012624777B2

(12) United States Patent
Bikuña Ormazabal

(10) Patent No.: US 12,624,777 B2
(45) Date of Patent: May 12, 2026

(54) CONNECTING ASSEMBLY FOR A GAS COOKING APPLIANCE

(71) Applicant: COPRECI, S.COOP., Aretxabaleta (ES)

(72) Inventor: Xabier Bikuña Ormazabal, Oñati (ES)

(73) Assignee: COPRECI, S.COOP., Aretxabaleta (ES)

( * ) Notice: Subject to any disclaimer, the term of this patent is extended or adjusted under 35 U.S.C. 154(b) by 710 days.

(21) Appl. No.: 17/988,127

(22) Filed: Nov. 16, 2022

(65) Prior Publication Data

US 2023/0151910 A1 May 18, 2023

(30) Foreign Application Priority Data

Nov. 16, 2021 (EP) ..................................... 21383039

(51) Int. Cl.
| | |
|---|---|
| *F16L 13/02* | (2006.01) |
| *F16L 15/04* | (2006.01) |
| *F16L 25/00* | (2006.01) |
| *F16L 33/26* | (2006.01) |
| *F16L 41/03* | (2006.01) |
| *F16L 41/08* | (2006.01) |
| *F16L 11/15* | (2006.01) |
| *F24C 3/00* | (2006.01) |

(52) U.S. Cl.
CPC ........... *F16L 15/04* (2013.01); *F16L 13/0209* (2013.01); *F16L 25/0036* (2013.01); *F16L 33/26* (2013.01); *F16L 41/03* (2013.01); *F16L 41/086* (2013.01); *F16L 11/15* (2013.01); *F24C 3/008* (2013.01)

(58) Field of Classification Search
CPC ....... F16L 15/04; F16L 33/26; F16L 25/0036; F16L 41/03; F16L 41/086; F16L 11/15; F16L 13/0209; F16L 41/025; F16L 41/14; F24C 3/008; Y10T 137/85938
See application file for complete search history.

(56) References Cited

U.S. PATENT DOCUMENTS

| | | | |
|---|---|---|---|
| 5,803,128 A | 9/1998 | Reed | |
| 5,979,430 A | 11/1999 | Peed et al. | |
| 6,082,397 A | 7/2000 | Casolari et al. | |
| 10,302,055 B2 * | 5/2019 | Nishizawa ........... | F02M 69/465 |
| 2005/0199293 A1 | 9/2005 | Fulcher et al. | |
| 2020/0200295 A1 | 6/2020 | Di Carlo et al. | |

FOREIGN PATENT DOCUMENTS

| | | | | |
|---|---|---|---|---|
| CN | 106196184 A | * 12/2016 | ............. | F24C 15/00 |
| CN | 112555826 A | 3/2021 | | |
| DE | 202020104470 U1 | 9/2020 | | |
| GB | 2230582 A | 10/1990 | | |
| KR | 20180047622 A | * 5/2018 | .......... | F16L 25/0036 |

OTHER PUBLICATIONS

European Search Report, EP21383039, Apr. 1, 2022, 9 pages.

* cited by examiner

*Primary Examiner* — Marina A Tietjen
(74) *Attorney, Agent, or Firm* — Edell, Shapiro & Finnan, LLC

(57) ABSTRACT

Connecting assembly of a gas cooking appliance that includes a flexible tube and a connector fixed to a first end of said flexible tube, the connector being configured to be directly connected to an opening of a manifold of the gas cooking appliance.

15 Claims, 8 Drawing Sheets

CONNECTING ASSEMBLY FOR A GAS COOKING APPLIANCE

CROSS-REFERENCE TO RELATED APPLICATIONS

This application relates to and claims the benefit and priority to European Application No. EP21383039.1, filed Nov. 16, 2021, which is incorporated herein by reference in its entirety.

FIELD

The present invention relates to connecting assemblies for a gas cooking appliance, to gas distribution assemblies which incorporate said connecting assembly, and to gas cooking appliances which incorporate said gas distribution assembly.

BACKGROUND

Connecting assemblies configured for connecting a gas manifold to a gas inlet are known. In solutions of this type, the connecting assembly usually comprises a tube which is usually rigid and a connector configured for being coupled to a connector arranged in the manifold.

Moreover, gas appliances which, due to their characteristics, require a gas distribution assembly with a manifold having a complex shape, for example, a manifold having curved segments to enable circumventing part of the electronics of the appliance gas, are known.

DISCLOSURE OF THE INVENTION

Provided is a connecting assembly for a gas cooking appliance, a gas distribution assembly which incorporates said connecting assembly, and a gas cooking appliance which incorporates said gas distribution assembly.

A first aspect of the invention relates to a connecting assembly for a gas cooking appliance.

The connecting assembly of the invention comprises a flexible tube and a connector fixed to a first end of said flexible tube. The connector is configured for being directly connected to an opening of a manifold of the gas cooking appliance.

The connecting assembly can be used, on one hand, to connect the manifold of the cooking appliance to a gas inlet. The connecting assembly can also be used to connect two manifolds in series. In both cases, the flexibility offered by the flexible tube provides a connecting assembly which easily adapts to different morphologies of cooking gas appliances. Furthermore, the fact that the connector is configured for being directly connected to an opening of a manifold without having to arrange a compatible connector in the manifold offers a simple and cost-effective solution.

A second aspect relates to a gas distribution assembly for a gas cooking appliance.

The gas distribution assembly of the invention comprises a first manifold comprising an opening, and a connecting assembly comprising a flexible tube and a connector fixed to a first end of said flexible tube. The connector is directly connected to the opening of the first manifold.

The fact that the connector is directly connected to the opening of the first manifold greatly simplifies the manufacturing of the gas distribution assembly, since it is sufficient to simply make an opening in the manifold, and therefore the need to arrange a connector in the manifold is avoided. Therefore, in addition to being a solution that is easier to manufacture, the present invention is also less expensive.

Furthermore, the gas distribution assembly of the invention is particularly advantageous for use in cooking appliances the morphology of which requires having a manifold with a complex shape, for example with curved portions. Manifolds with complex shapes of this type are usually difficult to manufacture. The gas distribution assembly of the invention adapts to morphologies of this type by joining in series at least two manifolds that are easy to manufacture, preferably straight manifolds, by means of a corresponding connecting assembly, greatly facilitating the manufacturing of the gas distribution assembly.

A third aspect of the invention relates to a gas cooking appliance.

The gas cooking appliance of the invention comprises a gas distribution assembly like the one described in the second aspect of the invention.

These and other advantages and features will become apparent in view of the figures and the detailed description.

DETAILED DESCRIPTION

Figure 1:
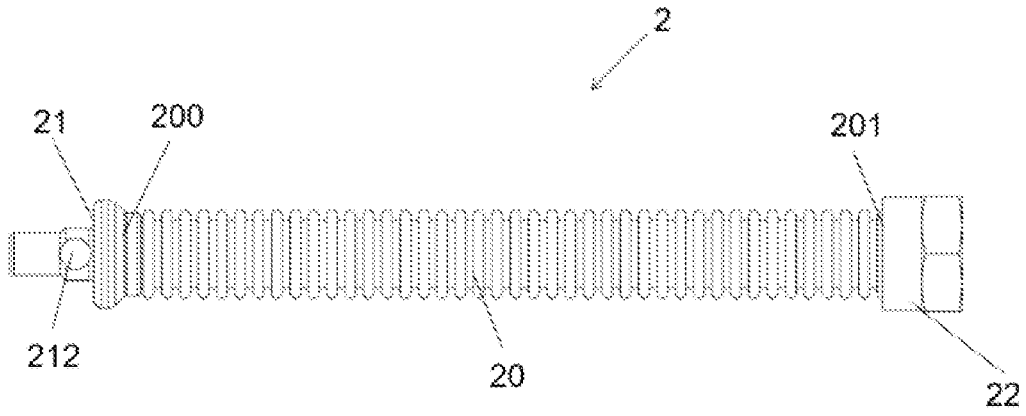
FIG. 1 shows a connecting assembly according to a first embodiment.

A first aspect of the invention relates to a connecting assembly 2, 3 for a gas cooking appliance.

The connecting assembly 2, 3 comprises a flexible tube 20, 30 and a first connector 21, 31 fixed to a first end 200, 300 of said flexible tube 20, 30. The first connector 21, 31 is configured for being directly connected to an opening of a manifold of the gas cooking appliance.

Preferably, the flexible tube 20, 30 is a corrugated tube, and more preferably a corrugated tube made of stainless steel.

Preferably, the first connector 21, 31 is a "BOLT THRU" type connector. This type of connection is currently used, for example, to connect a gas regulating valve to a corresponding manifold. Therefore, the first connector 21, 31 preferably comprises a first portion 210, 310 fixed to the flexible tube 20, 30 and a second portion 211, 311 after the first portion 210, 310, said second portion 211, 311 comprising a transverse opening 212, 312 configured for being arranged inside the manifold when the connecting assembly 2, 3 is connected to the manifold such that gas can flow between the inside of the flexible tube 20, 30 and the manifold through said transverse opening 212, 312. Preferably, the first connector 21, 31 comprises a threaded longitudinal hole 213, 313 at the free end of the second portion 211, 311, said threaded longitudinal hole 213, 313 being configured for receiving a screw 23, 33 for connecting the first connector 21, 31 to the manifold.

In the case where the first connector 21, 31 is a "BOLT THRU" type connector, the connecting assembly 2, 3 preferably comprises a screw 23, 33 configured for being screwed into the threaded longitudinal hole 213, 313 of the second portion 211, 311 of the first connector 21, 31 for fixing the first connector 21, 31 to the manifold. More preferably, the connecting assembly 2, 3 also comprises a first sealing element 24, 34 configured for sealing the joint between the screw 23, 33 and the manifold when the first connector 21, 31 is connected to the manifold. Furthermore, the connecting assembly 2, 3 preferably comprises a second sealing element 25, 35 configured for sealing the joint between the first connector 21, 31 and the manifold when the first connector 21, 31 is connected to the manifold.

Therefore, in the case where the first connector 21, 31 is a "BOLT THRU" type connector, the second portion 211, 311 of the first connector 21, 31 is preferably configured for being introduced in the opening 40a, 41b of the manifold and for being fixed to the manifold with the screw 23, 33 being introduced through an additional opening 40b, 41b of the manifold, the additional opening 40b, 41b being arranged facing the opening 40a, 41a in which the second portion 211, 311 of the connector 21, 31 is introduced.

According to one embodiment, the first connector 21, 31 is a deformed tube, with the tube being preferably made of stainless steel. The connector 21, 31 being a deformed tube makes the manufacture easier and more cost effective with respect to connectors manufactured by bar turning machining, for example.

Preferably, the first connector 21, 31 is fixed to the flexible tube 20, 30 by welding, for example, by laser welding, plasma welding, etc.

Figure 2:
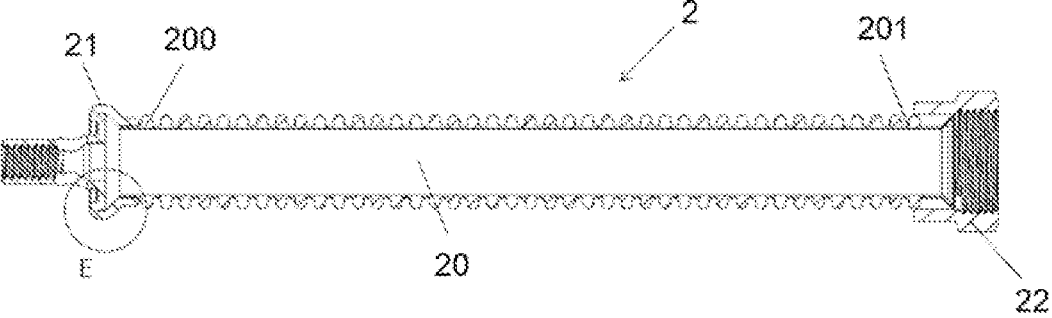
FIG. 2 shows a sectional view of the connecting assembly of FIG. 1.

In a preferred embodiment, the connecting assembly 2 comprises an inlet connector 22 fixed to a second end 201 of the flexible tube 20, said inlet connector 22 being configured to be connected to a gas inlet, as shown in FIGS. 1 and 2. This type of connecting assembly 2 is used to connect a manifold 2 to a gas supply source through which gas is supplied to the corresponding cooking appliance. In the context of the invention, this type of connecting assembly comprising a first connector configured for being directly connected to an opening of a manifold and an inlet connector configured for being connected to a gas inlet will be referred to as an inlet connecting assembly.

Figure 3:
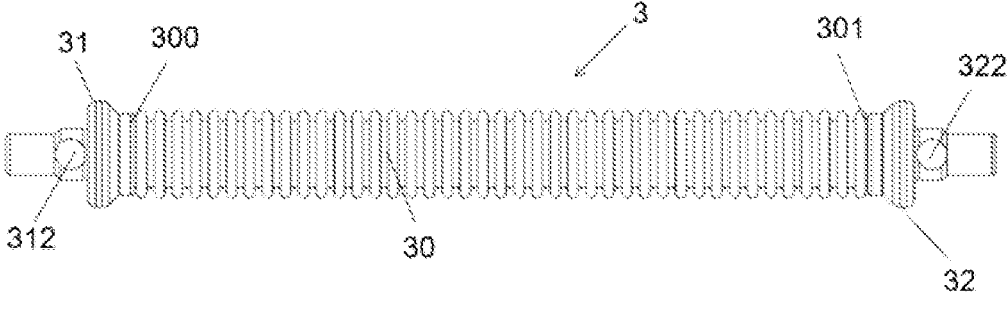
FIG. 3 shows a connecting assembly according to s second embodiment.
Figure 4:
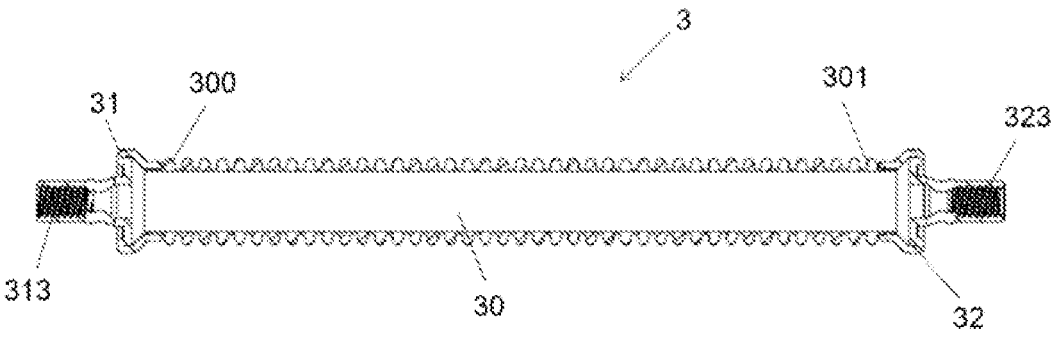
FIG. 4 shows a sectional view of the connecting assembly of FIG. 3.

In a preferred alternative embodiment, the connecting assembly 3 may comprise a second connector 32 fixed to a second end 301 of the flexible tube 30, the first connector 31 and the second connector 32 being of the same type, i.e., the first connector 31 and the second connector 32 being substantially identical, as shown in FIGS. 3 and 4. The second connector 32 would therefore be configured for being directly connected to an opening of a second manifold of the gas cooking appliance. This type of connecting assembly 3 is used to connect two manifolds in series such that gas flows between both manifolds through the connecting assembly 3. In the context of the invention, this type of connecting assembly comprising a first connector and a second connector that are identical, with said connectors being configured to be directly connected to an opening of a respective manifold, will be referred to as a coupling connecting assembly. In the context of the invention, two manifolds are considered to be connected in series by means of a connecting assembly when the first connector of the connecting assembly is connected to one of the manifolds and the second connector is connected to the other manifold.

A second aspect of the invention relates to a gas distribution assembly 1 for a gas cooking appliance.

The gas distribution assembly 1 is the component of the gas cooking appliance which distributes gas from a gas supply source to the gas burners of the gas cooking appliance through a series of gas regulating valves (not depicted in the figures).

The gas distribution assembly 1 of the invention comprises a first manifold 4 comprising an opening 40a and a connecting assembly 2, 3 like the one described above. The first connector 21, 31 of the connecting assembly 2, 3 is directly connected to the opening 40a of the first manifold 4.

In a preferred embodiment, the connecting assembly 2 comprises an inlet connector 22 fixed to a second end 201 of the flexible tube 20, the inlet connector 22 being configured to be connected to a gas inlet.

Furthermore, the gas distribution assembly may comprise a second manifold 5 and a second connecting assembly 3, said second connecting assembly 3 being of the type defined above as a coupling connecting assembly, such that the first manifold 4 and the second manifold 5 would be connected in series by means of the second connecting assembly 3. Therefore, the first connector 31 of the second connecting assembly 3 would be directly connected to a connection opening 41a of the first manifold 4 and the second connector 32 of the second connecting assembly 3 would be directly connected to a connection opening of the second manifold 5.

In a preferred alternative embodiment, the distribution assembly may comprise two manifolds connected in series by means of a connecting assembly defined above as a coupling connecting assembly, regardless of how connection to the gas inlet is made.

In a preferred alternative embodiment, the gas distribution assembly may comprise at least three manifolds 4, 5, 6, said manifolds being connected in series by means of at least two connecting assemblies 2, 3, said connecting assemblies being of the type defined above as a coupling connecting assembly. Therefore, the gas distribution assembly would comprise an initial manifold 4, a final manifold 5, and at least one intermediate manifold 6, the initial manifold 4 and the final manifold 5 comprising a respective coupling opening and each intermediate manifold 6 comprising two coupling openings, each manifold being connected to the next manifold by a corresponding connecting assembly 2, 3.

A third aspect of the invention relates to a gas cooking appliance comprising a gas distribution assembly such as those described above.

Preferably, the gas cooking appliance is a gas barbeque, cooker, or gas hob.

FIGS. 1 and 2 show a first embodiment of the connecting assembly 2 for a gas cooking appliance according to the invention.

The connecting assembly 2 of this first embodiment comprises a flexible tube 20, a first connector 21 fixed to a first end 200 of the flexible tube 20, and an inlet connector 22 fixed to a second end 201 of the flexible tube 20. The first connector 21 is configured for being directly connected to an opening of a manifold of the gas cooking appliance, whereas the inlet connector 22 is configured for being connected to a gas inlet. Therefore, the connecting assembly 2 of this first embodiment is configured for connecting a manifold and a gas inlet, and it is therefore of the type defined above as an inlet connecting assembly.

In this first embodiment, the flexible tube 20 is a corrugated tube. Furthermore, both the flexible tube 20 and the first connector 21 are preferably made of stainless steel, with both parts being attached to one another by welding. The fact that both parts are made of the same material allows a homogenous welding to be obtained.

Preferably, the first connector 21 is a deformed tube.

Figure 5:
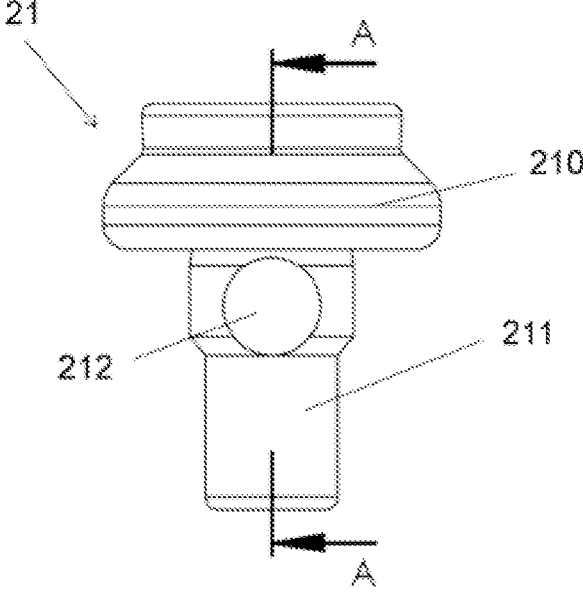
FIG. 5 shows a front view of the first connector of the connecting assembly of FIG. 1.
Figure 6:
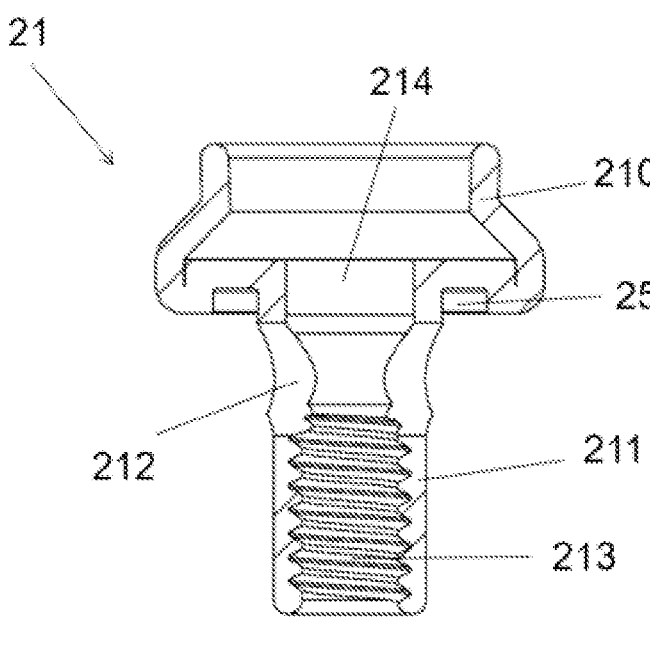
FIG. 6 shows a sectional view of the first connector of FIG. 5.
Figure 7:
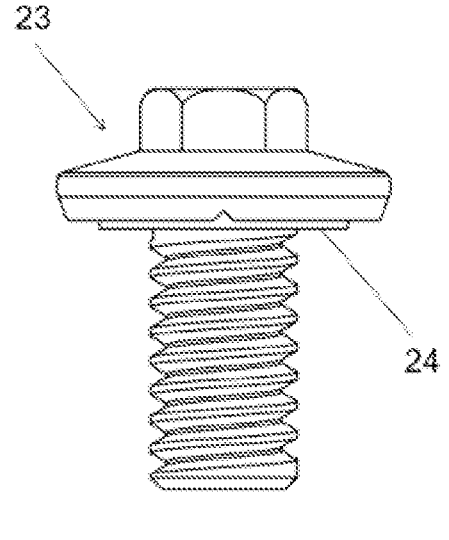
FIG. 7 shows a view of the screw associated with the first connector of the connecting assembly of FIG. 1.

The first connector 21 of the connecting assembly 2 of this first embodiment is a "BOLT THRU" type connector, as can be seen in detail in FIGS. 5 and 6. Therefore, the first connector 21 comprises a first portion 210 fixed to the flexible tube 20 and a second portion 211 after the first portion 210, said second portion 211 comprising a transverse opening 212 configured for being arranged inside the manifold when the connecting assembly 2 is connected to the manifold, such that gas can flow between the inside of the flexible tube 20 and the manifold through said transverse opening 212. Furthermore, the free end of the second portion 211 of the first connector 21 comprises a threaded longitudinal hole 213 configured for receiving a screw 23 for connecting the first connector 21 to the manifold.

The connecting assembly 2 of this first embodiment also comprises a screw 23 configured for being screwed into the threaded longitudinal hole 213 of the second portion 211 of the first connector 21 for fixing the first connector 21 to the corresponding manifold.

Furthermore, the connecting assembly 2 of this first embodiment comprises a first sealing element 24 configured for sealing the joint between the screw 23 and the manifold when the first connector 21 is connected to the manifold, and a second sealing element 25 configured for sealing the joint between the first connector 21 and the manifold when the first connector 21 is connected to the manifold.

FIGS. 3 and 4 show a second embodiment of the connecting assembly 3 for a gas cooking appliance according to the invention.

The connecting assembly 3 of this second embodiment comprises a flexible tube 30, a first connector 31 fixed to a first end 300 of the flexible tube 30, and a second connector 32 fixed to a second end 301 of the flexible tube 30, with the first connector 31 and the second connector 32 being the same type, i.e., having the same features and are therefore substantially identical. Both the first connector 31 and the second connector 32 are configured for being directly connected to an opening of a respective manifold of the gas cooking appliance. Therefore, the connecting assembly 3 of this second embodiment is configured for connecting two manifolds, and it is therefore of the type defined above as a coupling connecting assembly.

In this second embodiment, the flexible tube 30 is a corrugated tube. Furthermore, the flexible tube 30, the first connector 31, and the second connector 32 are preferably made of stainless steel, with both connectors 31 and 32 being attached to the flexible tube by welding. The fact that the parts are made of the same material allows a homogenous welding to be obtained.

According to one embodiment, the first connector 31 and the second connector 32 are parts which are obtained by the deformation of a corresponding tube.

Both the first connector 31 and the second connector of the connecting assembly 3 of this second embodiment are "BOLT THRU" type connectors. The features of said first connector 31 and said second connector 32 are similar to those of the first connector 21 of the connecting assembly 2 of the first embodiment and therefore it is not considered necessary to describe them again.

The connecting assembly 3 of this second embodiment also comprises a screw 33 configured for being screwed into the threaded longitudinal hole of the second portion of the first connector 31 for fixing the first connector 21 to a first manifold and a second screw 36 configured for being screwed into the threaded longitudinal hole of the second portion of the second connector 32 for fixing the second connector 31 to a second manifold.

Furthermore, the connecting assembly 3 of this second embodiment comprises a first sealing element configured for sealing the joint between the screw 33 and the corresponding manifold when the first connector 31 is connected to the manifold, and a second sealing element configured for sealing the joint between the first connector 31 and the corresponding manifold when the first connector 31 is connected to the manifold. The connecting assembly 3 of this second embodiment also comprises a third sealing element configured for sealing the joint between the second screw 36 and the corresponding manifold when the second connector 32 is connected to the manifold, and a fourth sealing element configured for sealing the joint between the second connector 32 and the corresponding manifold when the second connector 32 is connected to the manifold.

Figure 8:
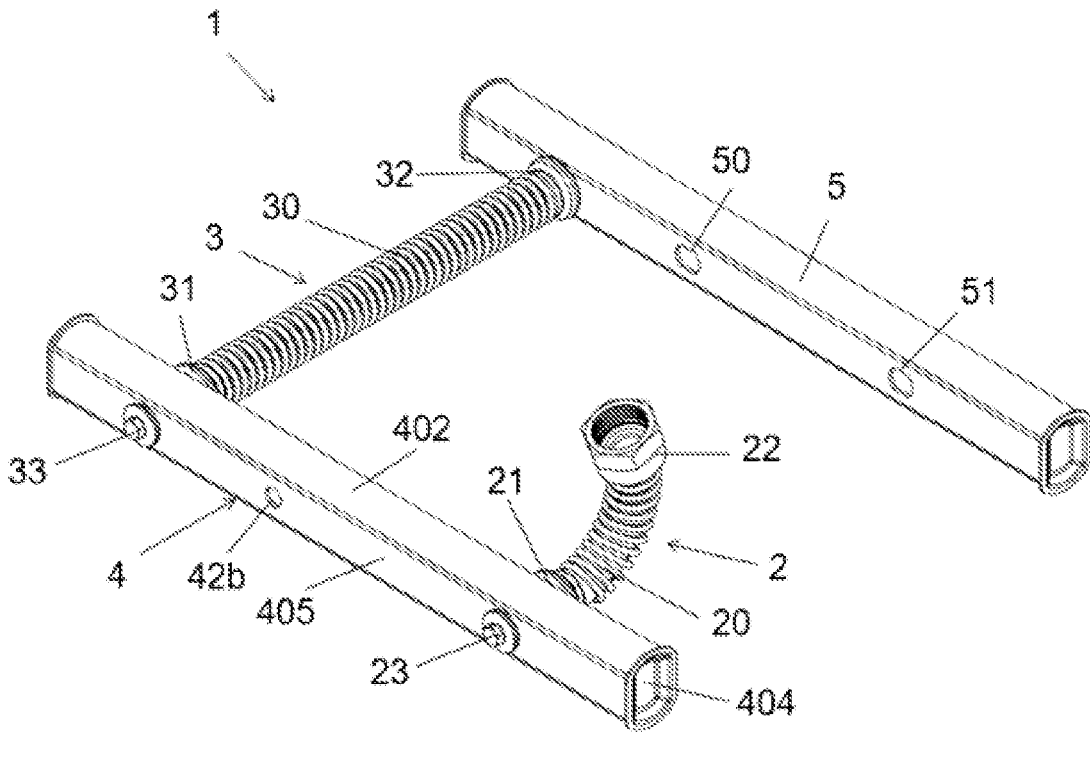
FIG. 8 shows a perspective view of a gas distribution assembly according to one embodiment.
Figure 9:
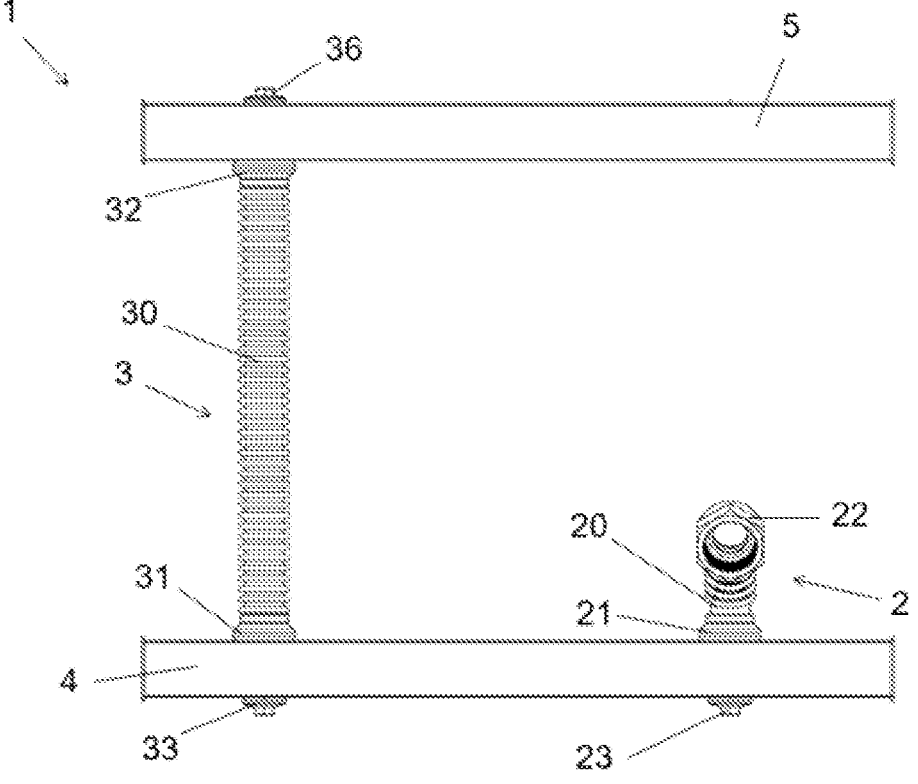
FIG. 9 shows a plan view of the gas distribution assembly of FIG. 8.

FIGS. 8 and 9 show an embodiment of the gas distribution assembly 1 for a gas cooking appliance according to the invention.

In this embodiment, the gas distribution assembly 1 comprises a first manifold 4 and a second manifold 5.

Figure 10:
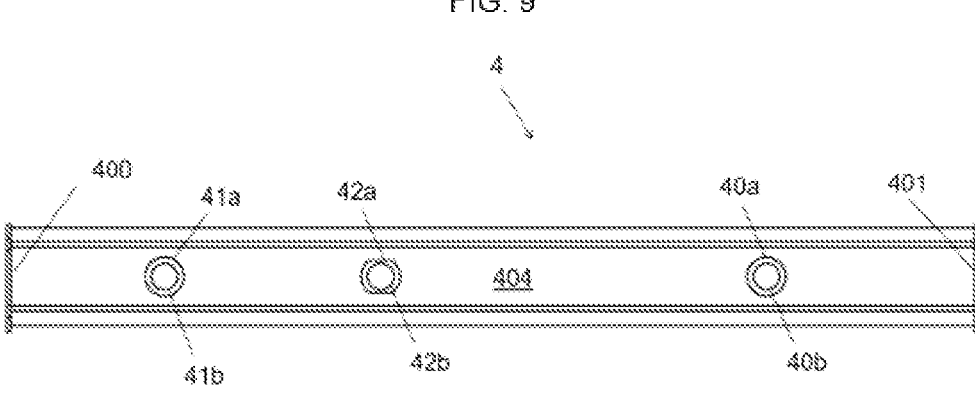
FIG. 10 shows a view of the first manifold of the gas distribution assembly of FIG. 8.
Figure 11:
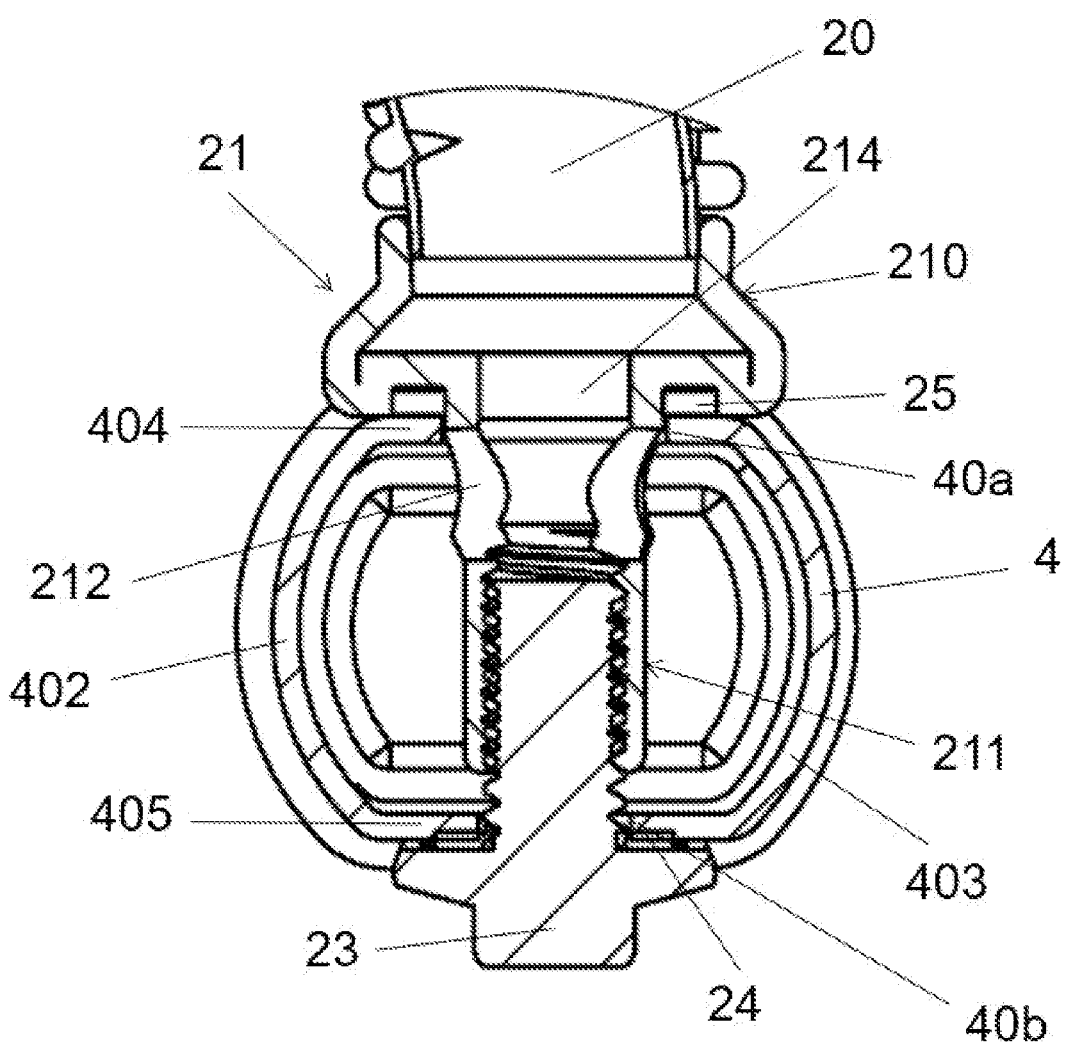
FIG. 11 shows a sectional view of the gas distribution assembly of FIG. 8.
Figure 12:
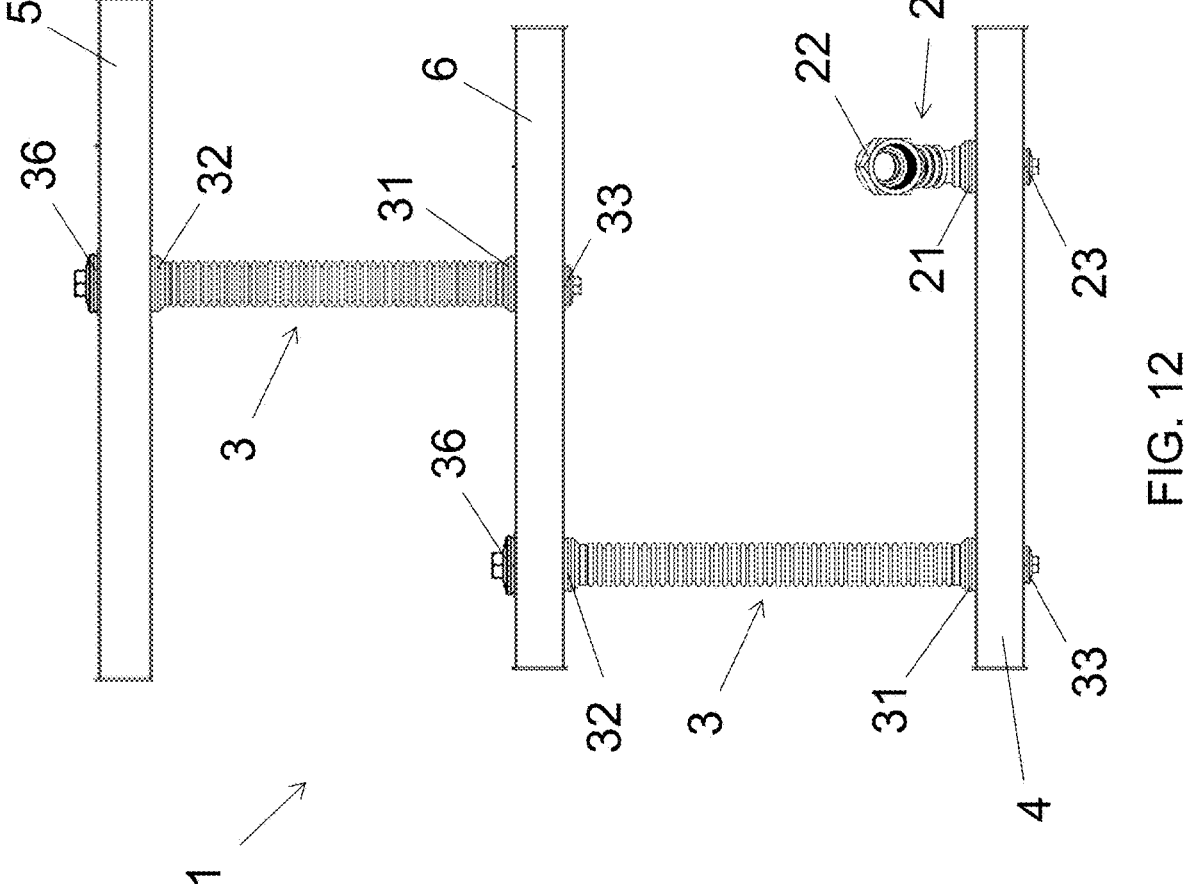
FIG. 12 shows a plan view of the gas distribution assembly having three manifolds.
Figure 13:
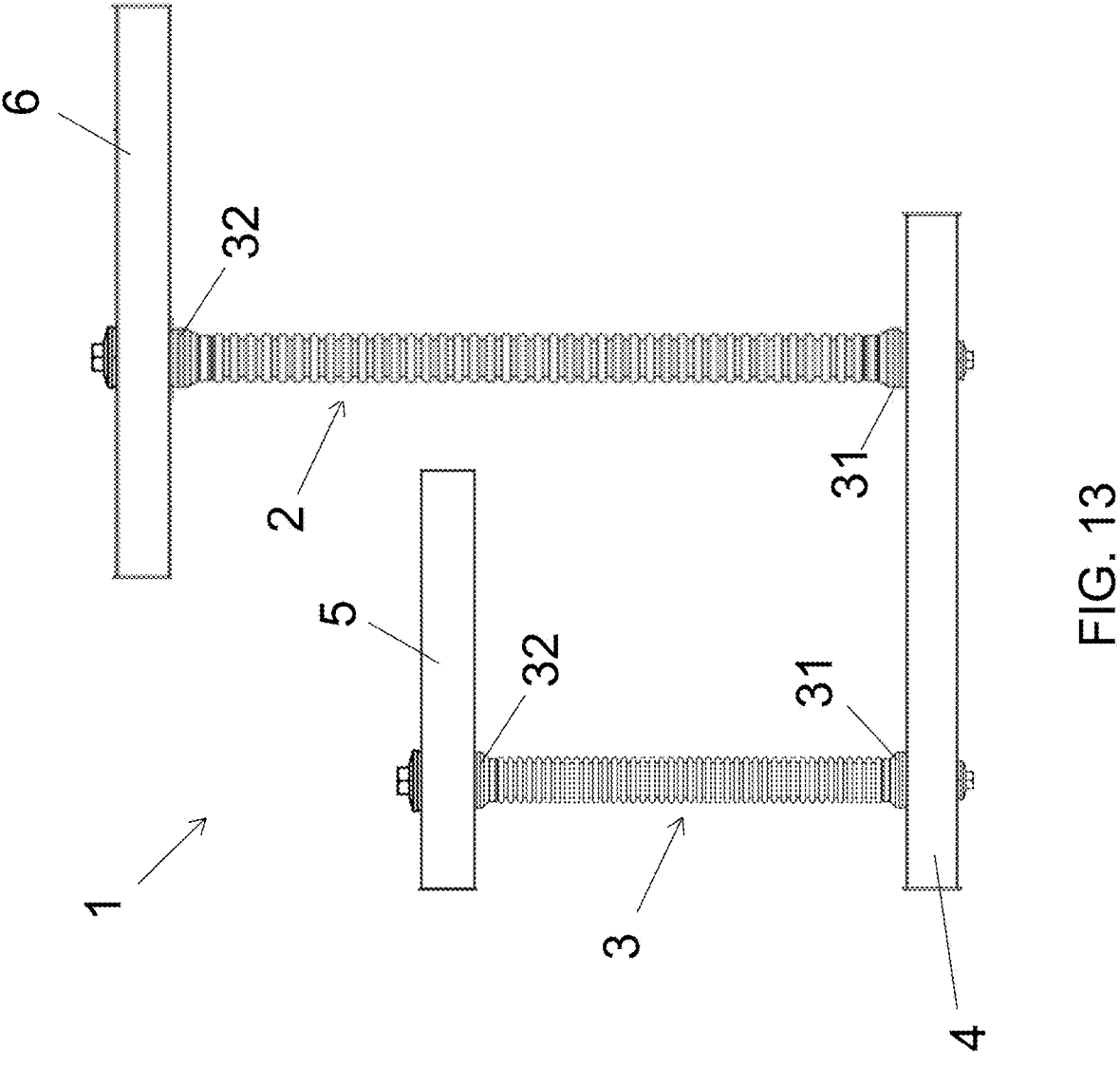
FIG. 13 shows a plan view of the gas distribution assembly having three manifolds.

The first manifold 4 of this embodiment, shown in detail in FIG. 10, is a tube which is closed at both ends 400, 401. The first manifold 4 comprises two planar walls 404 and 405 arranged parallel to one another, said planar walls 404 and 405 being joined to one another by means of two curved walls 402 and 403 arranged facing one another. The second manifold 5 of this embodiment has the same shape as the first manifold 4.

As shown in detail in FIG. 10, in this first embodiment, the first manifold 4 comprises an inlet opening 40a, a coupling opening 41a, and an outlet opening 42a on one of its planar faces 404, and an additional opening 40b, 41b, 42b facing each of said openings 40a, 41a, and 42a, the additional openings being arranged on the other planar face 405 of the first manifold 4.

Furthermore, the second manifold 5 comprises a coupling opening and a pair of outlet openings 50 and 51 on one of the planar faces of the second manifold 5, and an additional opening facing each of said openings, the additional openings being arranged on the other planar face of the second manifold 5.

In this embodiment, the gas distribution assembly 1 also comprises a first connecting assembly 2 and a second connecting assembly 3.

The first connecting assembly 2 is a connecting assembly like the one shown in FIGS. 1 and 2 and reproduces the features described above for the first embodiment of the connecting assembly 2. Therefore, the first connecting assembly 2 is configured for connecting the first manifold 4 to a gas inlet, and it is therefore of the type defined above as an inlet connecting assembly. To that end, the first connector 21 of the first connecting assembly 2 is directly connected to the inlet opening 40a of the first manifold 4 by introducing the second portion 211 of the first connector 21 in said inlet opening 40a and fixing same to the first manifold 4 by introducing the screw 23 through additional opening 40b facing the inlet opening 40a.

The second connecting assembly 3 is a connecting assembly like the one shown in FIGS. 3 and 4 and reproduces the features described above for the second embodiment of the connecting assembly 3. Therefore, the second connecting assembly 3 connects the first manifold 4 and the second manifold 5, and it is therefore a connecting assembly of the type defined above as a coupling connecting assembly. Therefore, gas entering the first manifold 4 through the first connecting assembly 2 can flow to the second manifold 5 through the second connecting assembly 3. To that end, the first connector 31 of the second connecting assembly 3 is directly connected to the coupling opening 41a of the first manifold 4 by introducing the second portion of the first connector 31 in said coupling opening 41a and fixing same to the first manifold 4 by introducing the screw 33 through the additional opening 41b facing the coupling opening 41a. The second connector 32 of the second connecting assembly 3 is directly connected to the coupling opening of the second manifold 5 by introducing the second portion of the second connector 32 in said coupling opening and fixing same to the second manifold 5 by introducing the screw 36 through the additional opening facing the coupling opening.

According to some embodiments, the distribution assembly of this embodiment comprises at least three gas regulating valves, not shown in the figures, each valve being coupled to a corresponding outlet opening 42, 50, and 51.

In another possible embodiment, not shown in the figures, the gas distribution assembly comprises a plurality of manifolds, each manifold comprising at least one coupling opening and a plurality of connecting assemblies of the type defined above as a coupling connecting assembly, such that the plurality of manifolds is connected in series by means of said connecting assemblies.

A third aspect of the invention relates to a gas cooking appliance comprising a gas distribution assembly according to any the embodiments described above.

The following clauses disclose additional embodiments.

Clause 1. Connecting assembly for a gas cooking appliance, comprising a flexible tube (20, 30) and a connector (21, 31) fixed to a first end (200, 300) of said flexible tube (20, 30), the connector (21, 31) being configured to be directly connected to an opening (40a, 41a) of a manifold of the gas cooking appliance.

Clause 2. Connecting assembly according to clause 1, wherein the flexible tube (20, 30) is a corrugated tube, preferably a corrugated tube made of stainless steel.

Clause 3. Connecting assembly according to clause 1 or 2, wherein the connector (21, 31) is a deformed tube, preferably a tube made of stainless steel.

Clause 4. Connecting assembly according to any of clauses 1 to 3, wherein the connector (21, 31) comprises a first portion (210, 310) fixed to the flexible tube (20, 30) and a second portion (211, 311) after the first portion (210, 310), said second portion (211, 311) comprising a transverse opening (212, 312) configured for being arranged inside the manifold when the connecting assembly (2, 3) is connected to the manifold, such that gas can flow between the inside of the flexible tube (20, 30) and the manifold through said transverse opening (212, 312).

Clause 5. Connecting assembly according to clause 4, wherein the free end of the second portion (211, 311) of the connector (21, 31) comprises a threaded longitudinal hole (213, 313) configured for receiving a screw (23, 33) for connecting the connector (21, 31) to the manifold, the connecting assembly (2) comprising a screw (23, 33) configured for being screwed into the threaded longitudinal hole (213, 313) of the second portion (211, 311) of the connector (21, 31) so as to fix the connector (21, 31) to the manifold, the second portion (211, 311) of the connector (21, 31) being configured to be introduced in the opening (40a, 41a) of the manifold and fixed to the manifold by the screw (23, 33) being introduced through an additional opening (40b, 41b) of the manifold, the additional opening (40b, 41b) being arranged facing the opening (40a, 41b) in which the second portion (211, 311) of the connector (21, 31) is introduced.

Clause 6. Connecting assembly according to clause 5, comprising a first sealing element (24, 34) configured for sealing the joint between the screw (23, 33) and the manifold when the connector (21, 31) is connected to the manifold, and a second sealing element (25, 35) configured for sealing the joint between the connector (21, 31) and the manifold when the connector (21, 31) is connected to the manifold.

Clause 7. Connecting assembly according to any of clauses 1 to 6, wherein the connector (21, 31) is fixed to the flexible tube (20, 30) by welding.

Clause 8. Connecting assembly according to any of clauses 1 to 7, comprising a second connector (32) fixed to a second end (301) of the flexible tube (30), the connector (31) of the first end (300) and the second connector (32) being of the same type and said second connector (32) being configured to be directly connected to an opening of a second manifold of the gas cooking appliance.

Clause 9. Connecting assembly according to any of clauses 1 to 7, comprising an inlet connector (22) fixed to a second end (201) of the flexible tube (20), said inlet connector (22) being configured to be connected to a gas inlet.

Clause 10. Gas distribution assembly for a gas cooking appliance, comprising a manifold (4) comprising an opening (40a), and a connecting assembly (2, 3) according to any of clauses 1 to 7, the connector (21, 31) of the connecting assembly (2, 3) being directly connected to the opening (40a) of the manifold (4).

Clause 11. Gas distribution assembly according to clause 10, wherein the connecting assembly (2) comprises an inlet connector (22) fixed to a second end (201) of the flexible tube (20), the inlet connector (22) being configured to be connected to a gas inlet.

Clause 12. Gas distribution assembly according to clause 11, comprising a second manifold (5) comprising a connection opening, and a second connecting assembly (3) according to clause 8, the first manifold (4) comprising a connection opening (41a), the connector (31) of the first end (300) of the second connecting assembly (3) being directly connected to the connection opening (41a) of the first manifold (4), and the second connector (32) of the second connecting assembly (3) being directly connected to the connection opening of the second manifold (5).

Clause 13. Gas distribution assembly according to clause 10, comprising a second manifold (5) comprising a connection opening, the connecting assembly (3) comprising a second connector (32) fixed to a second end (301) of the flexible tube (30), the connector (31) of the first end (300) and the second connector (32) of the connecting assembly (3) being of the same type and said second connector (32) being directly connected to the connection opening of the second manifold (5).

Clause 14. Gas distribution assembly for a gas cooking appliance, comprising a plurality of manifolds, each manifold comprising at least one connection opening, and a plurality of connecting assemblies (3) according to clause 10, the plurality of manifolds being connected in series by means of said connecting assemblies (3).

Clause 15. Gas cooking appliance comprising a gas distribution assembly according to any of clauses 10 to 14.

What is claimed is:

1. A gas cooking appliance comprising:
a first manifold having a first connection opening and a second connection opening;
a second manifold having a first connection opening;
a first flexible tube having at a first end a first connector fixed directly to the first connection opening of the first manifold and configured to fluidly communicate the first flexible tube with an interior of the first manifold, the first connector at the first end of the first flexible tube comprising a deformed stainless steel tube, the first flexible tube being made of stainless steel, the first end of the first flexible tube being attached to the first connector by a first weld; and
a second flexible tube having at a first end a first connector fixed directly to the second connection opening of the first manifold and configured to fluidly communicate the second flexible tube with the interior of the first manifold, the second flexible tube having at a second end a second connector directly fixed to the first connection opening of the second manifold and configured to fluidly communicate the second flexible tube with the interior of the second manifold, the first connector at the first end of the second flexible tube comprising a deformed stainless steel tube, the second connector at the second end of the second flexible tube comprising a deformed stainless steel tube, the second flexible tube being made of stainless steel, the first end of the second flexible tube being attached to the first connector by a second weld, the second end of the second flexible tube being attached to the second connector by a third weld.

2. The gas cooking appliance according to claim 1, wherein the first connector of the first flexible tube includes a first portion fixed to the first end of the first flexible tube and a second portion in fluid communication with the first portion, the second portion including a transverse opening disposed in the interior of the first manifold.

3. The gas cooking appliance according to claim 2, wherein the second portion of the first connector of the first flexible tube comprises a threaded longitudinal hole in which resides a screw that fixes the first connector of the first flexible tube to the first manifold, the screw extending through an opening in the first manifold, the opening facing the first connection opening of the first manifold.

4. The gas cooking appliance according to claim 3, comprising a first sealing element that seals a joint between the screw and the first manifold, and a second sealing element that seals a joint between the first connector and the first manifold.

5. The gas cooking appliance according to claim 1, wherein the first connector of the second flexible tube includes a first portion fixed to the first end of the second flexible tube and a second portion in fluid communication with the first portion, the second portion including a transverse opening disposed in the interior of the first manifold.

6. The gas cooking appliance according to claim 5, wherein the second portion of the first connector of the second flexible tube comprises a threaded longitudinal hole in which resides a screw that fixes the first connector of the second flexible tube to the first manifold, the screw extending through an opening in the first manifold, the opening facing the second connection opening.

7. The gas cooking appliance according to claim 6, further comprising a first sealing element that seals a joint between the screw and the first manifold, and a second sealing element that seals a joint between the second connector and the first manifold.

8. The gas cooking appliance according to claim 1, wherein the second connector of the second flexible tube includes a first portion fixed to the second end of the second flexible tube and a second portion in fluid communication with the first portion, the second portion including a transverse opening disposed in the interior of the second manifold.

9. The gas cooking appliance according to claim 8, wherein the second portion of the second connector of the second flexible tube comprises a threaded longitudinal hole in which resides a screw that fixes the second connector of the second flexible tube to the second manifold, the screw extending through an opening in the second manifold, the opening facing the first connection opening of the second manifold.

10. The gas cooking appliance according to claim 9, further comprising a first sealing element that seals a joint between the screw and the second manifold, and a second sealing element that seals a joint between the second connector and the seconds manifold.

11. The gas cooking appliance according to claim 1, wherein the first connector of the first flexible tube includes a first portion fixed to the first end of the first flexible tube and a second portion in fluid communication with the first portion, the second portion including a transverse opening disposed in the interior of the first manifold, the first connector of the second flexible tube includes a first portion fixed to the first end of the second flexible tube and a second portion in fluid communication with the first portion of the first connector of the second flexible tube, the second portion of the first connector of the second flexible tube including a transverse opening disposed in the interior of the first manifold.

12. The gas cooking appliance according to claim 11, wherein the second connector of the second flexible tube includes a first portion fixed to the second end of the second flexible tube and a second portion in fluid communication with the first portion of the second connector, the second portion of the second connector including a transverse opening disposed in the interior of the second manifold.

13. The gas cooking appliance according to claim 1, wherein the first flexible tube has a second end to which is attached a gas inlet connector.

14. A gas cooking appliance comprising:
a first manifold having a first connection opening and a second connection opening;
a second manifold having a first connection opening;
a first flexible tube having at a first end a first connector fixed directly to the first connection opening of the first manifold and configured to fluidly communicate the first flexible tube with an interior of the first manifold, the first connector at the first end of the first flexible tube comprising a deformed stainless steel tube, the first flexible tube being made of stainless steel, the first end of the first flexible tube being attached to the first connector by a first weld;
a second flexible tube having at a first end a first connector fixed directly to the second connection opening of the first manifold and configured to fluidly communicate the second flexible tube with the interior of the first manifold, the second flexible tube having at a second end a second connector directly fixed to the first connection opening of the second manifold and configured to fluidly communicate the second flexible tube with the interior of the second manifold, the first connector at the first end of the second flexible tube comprising a deformed stainless steel tube, the second connector at the second end of the second flexible tube comprising a deformed stainless steel tube, the second flexible tube being made of stainless steel, the first end of the second flexible tube being attached to the first connector by a second weld, the second end of the second flexible tube being attached to the second connector by a third weld; and a third manifold having a first connection opening, and wherein the first flexible tube has second connector at a second end fixed directly to the first connection opening of the third manifold and configured to fluidly communicate the first flexible tube with an interior of the third manifold, the second connector at the second end of the first flexible tube comprising a deformed stainless steel tube, the first flexible tube being made of stainless steel, the second end of the first flexible tube being attached to the second connector by a fourth weld.

15. A gas cooking appliance comprising:

a first manifold having a first connection opening and a second connection opening;

a second manifold having a first connection opening and a second connection opening;

a third manifold having a first connection opening;

a first flexible tube having at a first end a first connector fixed directly to the first connection opening of the first manifold and configured to fluidly communicate the first flexible tube with an interior of the first manifold, the first connector at the first end of the first flexible tube comprising a deformed stainless steel tube, the first flexible tube being made of stainless steel, the first end of the first flexible tube being attached to the first connector by a first weld;

a second flexible tube having at a first end a first connector fixed directly to the second connection opening of the first manifold and configured to fluidly communicate the second flexible tube with the interior of the first manifold, the second flexible tube having at a second end a second connector directly fixed to the first connection opening of the second manifold and configured to fluidly communicate the second flexible tube with the interior of the second manifold, the first connector at the first end of the second flexible tube comprising a deformed stainless steel tube, the second connector at the second end of the second flexible tube comprising a deformed stainless steel tube, the second flexible tube being made of stainless steel, the first end of the second flexible tube being attached to the first connector by a second weld, the second end of the second flexible tube being attached to the second connector by a third weld;

a third flexible tube having at a first end a first connector fixed directly to the second connection opening of the second manifold and configured to fluidly communicate the third flexible tube with the interior of the second manifold, the third flexible tube having at a second end a second connector directly fixed to the first connection opening of the third manifold and configured to fluidly communicate the third flexible tube with the interior of the third manifold, the first connector at the first end of the third flexible tube comprising a deformed stainless steel tube, the second connector at the second end of the third flexible tube comprising a deformed stainless steel tube, the third flexible tube being made of stainless steel, the first end of the third flexible tube being attached to the first connector by a fourth weld, the second end of the third flexible tube being attached to the second connector by a fifth weld.

* * * * *